United States Patent
Nakanishi et al.

[11] 3,797,666
[45] Mar. 19, 1974

[54] APPARATUS FOR SEPARATING FINE OIL DROPLETS AND SLUDGE SUSPENDED IN LIQUID

[75] Inventors: Toru Nakanishi; Junichi Matsui; Setsuji Yonehara; Masahiro Aoki; Kiyonori Ishiguro, all of Otsu; Tatsuo Satake, Nishinomiya; Shingi Azuma, Osaka, all of Japan

[73] Assignees: Toray Industries, Inc., Tokyo; Toray Engineering Co., Ltd., Osaka, both of, Japan

[22] Filed: Aug. 10, 1971

[21] Appl. No.: 170,470

[30] Foreign Application Priority Data
Aug. 15, 1970 Japan.............................. 45-71147

[52] U.S. Cl................ 210/265, 210/23, 210/502, 210/DIG. 5
[51] Int. Cl....................... B01d 17/04, B01d 39/04
[58] Field of Search ............ 210/23, 488, 489, 492, 210/499, 502, 503, 505, 265, DIG. 5, 40, 83

[56] References Cited
UNITED STATES PATENTS

| | | |
|---|---|---|
| 3,617,548 | 11/1971 | Willihnganz ......................... 210/23 |
| 2,588,794 | 3/1952 | Barton .............................. 210/23 X |
| 2,405,838 | 8/1946 | Lawson et al.................. 210/DIG. 5 |
| 3,069,017 | 12/1962 | Colby............................. 210/505 X |
| 3,450,632 | 6/1969 | Olson et al........................... 210/23 |
| 3,645,398 | 2/1972 | Fiocco ............................ 210/489 X |

*Primary Examiner*—Samih N. Zaharna
*Assistant Examiner*—Thomas G. Wyse
*Attorney, Agent, or Firm*—Maleson, Kimmelman & Ratner

[57] ABSTRACT

The invention relates to the separation of fine oil droplets and sludge suspended in liquid which is achieved by the provision of an apparatus comprising at least one pair of (a) a packing chamber characterized as being irregularly packed with small pieces cut from fiber web and (b) a settling chamber; the liquid was fed into the packing chamber (a) where the fine oil droplets coalesce and, at the same time, the sludge is filtered out and then the liquid so treated was fed into the settling chamber (b) where the coalesced oil droplets are separated.

4 Claims, 14 Drawing Figures

APPARATUS FOR SEPARATING FINE OIL DROPLETS AND SLUDGE SUSPENDED IN LIQUID

This invention relates to an apparatus for the separation of fine oil droplets and sludge both suspended in liquid such as waste water from the factory, which involve firstly, coalescing the fine oil droplets and filtering the sludge at the same time and secondly, settling the processed liquid to effect phase separation.

Recently, rapid progress and expansion in industry have produced a serious problem; waste water from various factories pollutes the water along the coast and rivers. In particular, the waste water containing refuse oil does a great deal of damage to the water industry and therefore, developments of physical and chemical oil-processing apparatus have taken place from necessity.

Waste water processing techniques, which have been heretofore proposed, can be classified as follows:

a. API process and PPI process (both relying on specific gravity separation).
b. Flocculation-sedimentation process (relying on flocculation, adsorption and sedimentation).
c. Activated sludge process (relying on propagation, flocculation, adsorption and sedimentation).
d. Coalescer-utilizing process (relying on coalescence and specific gravity division).
e. Adsorption process (relying on adsorption).
f. Filter-utilizing process (relying on filtration). At present, these processing techniques are adopted individually in most cases in conformity with the demand.

However, an increase in the complexity of industrial processes has resulted in a wide diversity of types of waste water and therefore, waste water cannot be satisfactorily processed, in many cases, by the application of any one single processing technique as listed above.

Relative to the above, the present invention involves the processing of liquid containing fine oil droplets and sludge, such as oily waste water, relying upon a combination of filtration, coalescence, specific gravity separation and adsorption.

Fundamentals of the processing technique of the present invention are known; U.S. Pat. No. 3,239,452 describes a process for separating droplets of one liquid from a liquid mixture by passing the liquid mixture through a layer of polyolefin fibers whereby the droplets of one liquid are allowed to coalesce and then subjected to settling to be thereby separated.

The known process has, however, a serious drawback, i.e. since the polyolefin fiber packing utilized for the coalescence of droplets is in the form of sheet-like layers, the packing exhibits only a transient effect; it loses its coalescing effect in a short period of time as illustrated hereinafter in detail.

Therefore, an object of the present invention is to provide an improved apparatus for separating fine oil droplets and sludge both suspended in liquid, in which the drawback possessed by the known process is overcome so that the coalescing capacity of the packing lasts for a prolonged period.

Another object of the present invention is to provide an apparatus which maintain a far higher capacity for separation, as compared with the known process.

A further object of the present invention is to provide an improved packing material which possesses a far more enhanced capacity for filtration, coalescence and adsorption.

Other objects and advantages of the present invention will become apparent from the following description.

In accordance with the present invention, there is provided an apparatus for separating fine oil droplets and sludge both being suspended in liquid which comprises at least a. a packing chamber packed with small pieces cut from a fiber web for adsorption and coalescence of the fine oil droplets and filtration of the sludge and
b. a settling chamber for specific gravity separation of the coalesced oil droplets, an arrangement for making the liquid stream flow into and out of the chambers $a$ and $b$, and an arrangement for backwashing said small pieces in the chamber $a$.

Further, there is provided a process for separating fine oil droplets and sludge both being suspended in liquid in which at least one column comprising (a) a packing chamber packed with small pieces cut from a polyolefin fiber web at the upper part thereof and (b) a settling chamber at the lower part thereof are provided, which comprises the steps of i. feeding the liquid into the packing chamber $a$ where the fine oil droplets are allowed to coalesce and the sludge is filtered out and then,
ii. feeding the liquid, so treated through said chamber $a$ into the settling chamber $b$ where the coalesced oil droplets are separated.

The apparatus and the process of the present invention, of course, involve various embodiments wherein the packing chamber $a$ and the settling chamber $b$ are combined in various ways, as hereinafter illustrated.

First of all the principle of the separation system of the present invention is illustrated.

A packing to be used in the present invention is composed of small pieces cut from a fiber web. By the term "fiber web" used herein is meant a "felt-like fibrous structure wherein individual filaments or staple fibers are three-dimensionally interlocked with each other", which may be made, for example, by extruding a fiber-forming liquid through an orifice while blowing a gas stream at the same time as the liquid leaves the orifice, i.e. before the liquid is shaped into a fiber, or immediately after the liquid is shaped into a fiber and the freshly spun fiber having not yet completely solidified is made to run against a collecting surface which is moving continuously. Accordingly, the small piece is a structure possessing a great number of slender and continuously elongated void spaces therein.

In accordance with the present invention, an aqueous dispersion containing fine oil droplets is allowed to flow through a chamber $a$ which is packed with a great number of small pieces cut from a fiber web with irregularity to form a packing layer. While the aqueous dispersion flows through the very small capillary-like void spaces inside each small packing piece, as described above (which void spaces are referred to hereinafter as a "fixed phase") and through void spaces between the small packing pieces (which spaces are referred to hereinafter as a "fluidized phase"), fine oil droplets dispersed therein can readily be caused to coalesce through the courses of, collision of the fine oil droplets with each other and with the packing saturated therewith, adhesion thereof to the packing and separation of the oil droplets from the packing supersaturated therewith.

Sludge, which is contained in oily waste water, is usually of a soft and compressible type such as oil-containing scale. Therefore, meshes of conventional filters composed of a wire net or a cloth are readily choked up with the sludge, which cannot be easily removed even when the filter is back-washed, resulting in difficulty of reuse and shortening of the life cycle of the filter.

The packing layer of the present invention has two kinds of void spaces: very small spaces (fixed phase) and relatively large void spaces (fluidized phase) as described above, which are utilizable as passageways for filtering sludge and for leading the dispersion to the very small void spaces respectively, and three-dimensionally and organically combined with each other so that the packing layer constructs a filter as a whole.

The packing layer of the present invention exhibits a prolonged life cycle at low filtration pressure, as observed when a filtration area is expanded in a conventional filter. Further, since the packing layer is composed of small pieces of relatively soft felt-like material, it tends to shift in position and, to some degree, undergo a transformation, as compared with metal or ceramic packings, and therefore, sludge which has accumulated in the packing layer can be easily removed by backwashing while repeating the operation of applying and then abruptly releasing the pressure, which fact enables the filter to be used many times by the repeated resuscitation.

Large oil droplets, so coalesced in the packing layer, rise to the surface to form a separate layer when the dispersion is settled in a settling separator. Thus, a large number of the oil droplets suspended in waste water are removed through the coalescence and the settling.

The present invention is further described by reference to the accompanying drawings;

FIG. 4 illustrates another embodiment of the inventive apparatus, FIGS. 5(A) and (B) illustrate a state of packings charged in the coalescence chamber or the adsorption chamber, FIGS. 6(A) and (B) schematically illustrate the coalescence of oil droplets effected in the void spaces between the packings shown in FIGS. 5(A) and (B), FIGS. 7 and 8 schematically illustrate testing apparatus for determining water leakage pressure and air permeability, respectively.

Figure 1:
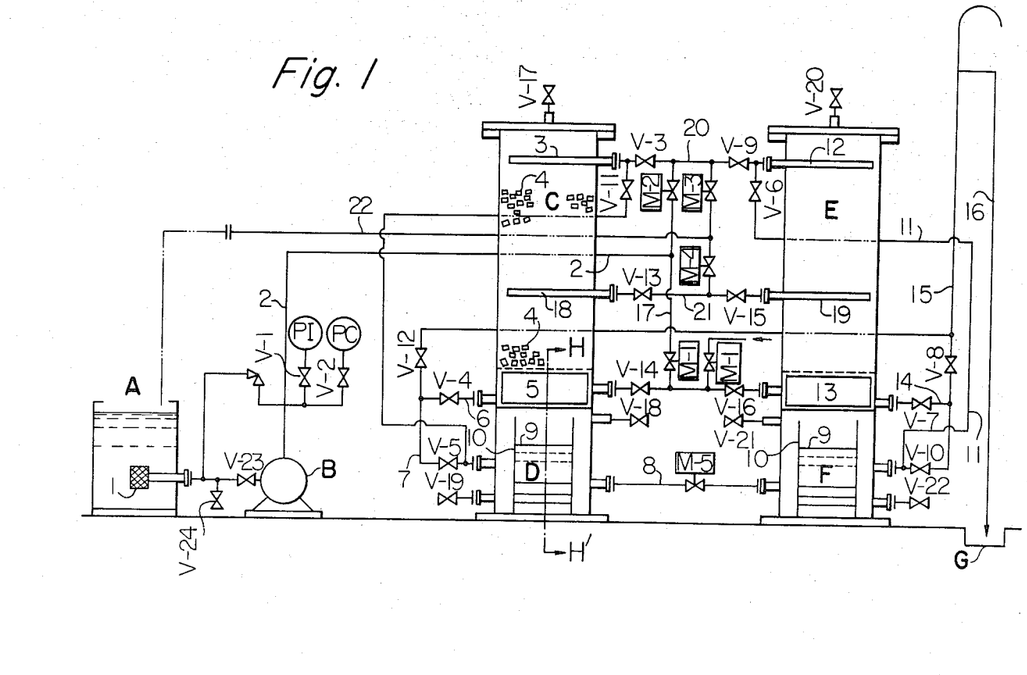
FIG. 1 illustrates an embodiment of the inventive apparatus.

Referring to FIG. 1, the inventive apparatus comprises an oily waste water feed stock tank A, a metering pump B, a sludge filtration or oil droplets coalescence chamber C, settling separators D and F, an oil droplets adsorption chamber E, an arrangement for flowing aqueous streams in the system and a control mechanism for backwashing. Oily waste water is fed to the inventive apparatus after a part of the dispersed phase roughly separates by settling thereof in the tank A.

Waste water is first fed from the tank A to an upper part of the sludge filtration or oil droplets coalescence chamber C through a suction filter 1, the pump B, a piping 2 and a liquid distributor 3. Sludge is removed while the stream flows through a packing layer 4 inside the chamber C. Fine oil droplets dispersed in the waste water are removed at first owing to adsorption onto the packing, but coalescence of the droplets assumes greater prominence with the lapse of time. After the removal of sludge and the coalescence of oil droplets, the liquid is successively passed through a packing layer-supporting bed 5, positioned beneath the packing layer where it exhibit a small pressure drop, and pipings 6 and 7 to a first settling separator D, and further through a piping 8 to a second settling separator F. The settling separators D and F involve a plurality of plates 9 which are arranged in parallel to each other and at an inclination relative to the horizontal plane, as illustrated in detail in FIG. 2. Coalesced oil droplets contained in the liquid fed between the plates 9 rise to run against the lower surface of the plate 9 and then rise along the surface to an upper part of the settling separators D and F, whereby phase separation is effected. Each settling separator is fitted with perforated plates 10 at both inlet and outlet sides of the inclined plates 9, which boards 10 are perpendicular to the direction of the liquid stream whereby uniform distribution of the liquid stream can be ensured. Thus, a large number of the oil droplets dispersed in waste water separate in the form of a separate layer of oil owing to differences in specific gravity and are withdrawn batchwise from the upper parts of the settling separators D and F by means of valves V-18 and V-21, respectively.

After the separation of coalesced oil droplets, the liquid is passed through a pipe 11 and a liquid distributor 12 into an adsorption chamber E, which has the same structure as that of the coalescence chamber C and is packed with the same packing material as that in the chamber C. In the adsorption chamber E, a small number of fine oil droplets remaining unremoved in the liquid are separated by adsorption. The water so treated flows through a packing layer-supporting bed 13 and drain pipes 14, 15 and 16 to a drain G.

Figures 2, 3:
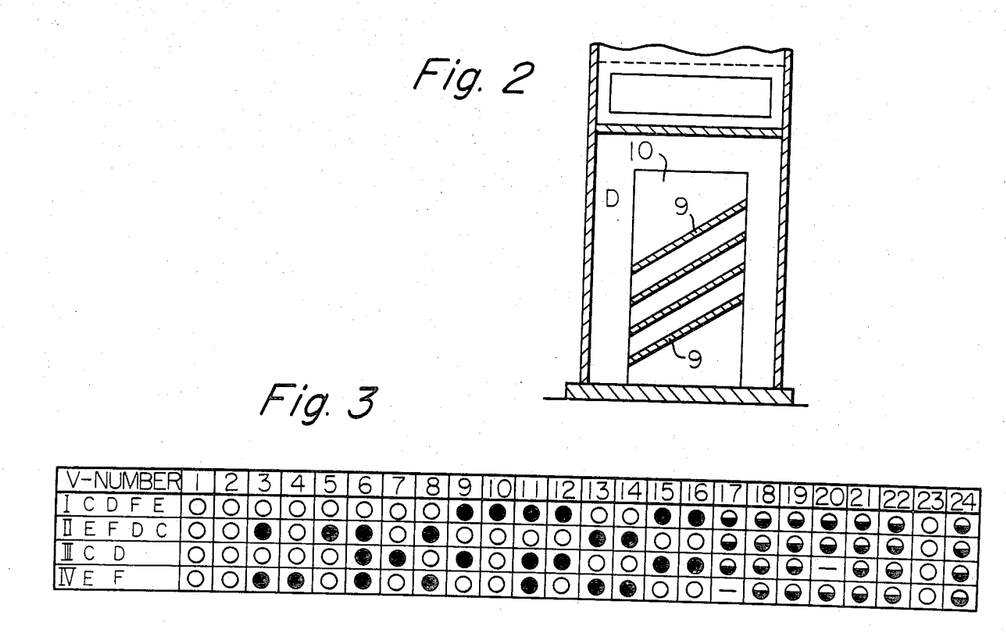
FIG. 2 is a diagram of an embodiment of the settling separator used in the inventive apparatus through the perpendicular cross section along the line H—H' of FIG. 1.
FIG. 3 is a diagram representing an open-shut state of valves arranged in the apparatus of FIG. 1.

The open-shut state of all the valves in the operation of the process described above following the route (C)-(D)-(F)-(E) is shown in FIG. 3, column I, wherein the marks ,  and ⊖ indicate open, shut and ordinarily shut or temporarily open, respectively.

The normal operation following the above route involves electric motor valves or electromagnetic valves M-2 and M-5 being open and M-1, M-3 and M-4 being shut. (By the symbol "M" is herein meant an electric motor valve or an electromagnetic valve.) When the normal operation continues for a prolonged period, the coalescence chamber is gradually choked up with sludge contained in the water feed and a pressure gauge PI indicates an increase of the pressure. At the time of the pressure reaching a stated limit or at a stated period, back-washing is carried out, which may be effected by automatically or manually repeating the operation of pressure-application and abrupt draining.

The following is an exemplification of backwashing wherein the operation is carried out under an automatic system.

All the operations from the start to the termination of backwash and the start of the next normal operation automatically proceed in order by operating an on-off switch (not shown in FIG. 1). First, simultaneously with turning on the backwash switch, valves M-2 M-3 and M-4 are shut and a valve M-1 are opened and the water feed is allowed to flow through a backwash pipe 17 into the lower parts of the coalescence chamber C and the adsorption chamber E and thus, the innner pressure of both the chambers C and E increases. When the inner pressure reaches a stated value (for example 1.5 to 3 kg/cm$^2$), the valves M-3 and M-4 are opened due to the action of a pressure controller PC and thus, the pressurized water is abruptly drained away from both the chambers C and E through drain pipes 20 and 21, a backwash pipe 22 and distributing pipes 3 and 12 or drain pipes 18 and 19 while sludge accumulated on the filter is carried out of the chambers. After the lapse of a stated period of time, e.g. 5 to 20 seconds, from the opening of the valves M-3 and M-4, the valves are shut again by the action of a first timer (not shown in FIG. 1) and thus, the inner pressure of the coalescence chamber C increases again, which leads to opening of the valves by the action of the pressure controller PC. After such discharge operation of the sludge is repeated several times, a second timer (not shown in FIG. 1) acts such that the normal operation starts again; the valves M-2 and M-5 are opened and M-1, M-3 and M-4 are shut. The total time required for backwashing is approximately 5 to 20 minutes. The sludge, so discharged, is allowed to go back to the waste water feed stock tank A where, owing to difference in specific gravity, the sludge either readily surfaces or sinks because sludge particles have already coalesced, and thus the sludge may be batchwise withdrawn therefrom.

In the exemplification mentioned above, the liquid for backwashing is fed from the tank A, but otherwise it may be fed from another fresh washing supply source (not shown in FIG. 1) through the valve M-1'.

When an oil content in the liquid having been treated through the above process exceeds a stated value after the lapse of the prolonged period of operation, the packings in both the chambers are replaced with new ones. Since the coalescence chamber C has the same structure as that of the adsorption chamber E and is packed with the same packing as that in the chamber E, as described above, only the packing in the coalescence chamber C may be replaced with a new one and, in the next cycle of operation, the chamber C may be utilized as an adsorption chamber.

A flow sheet of the latter operation is summarized as follows: (A)-(B)-(E)-(F)-(D)-(C)-(G). An open-shut state of all the valves is shown in FIG. 3, column II.

Further, in accordance with the present invention, a single pair of the chambers C and D or the chambers E and F may be utilized and accordingly, during the replacing operation of the packing in the chamber C or E, the system can be maintained in operation without interruption by utilizing merely the remaining chamber E or C, respectively, in which cases all the valves are in the state shown in FIG. 3, column III or IV.

Figure 4:
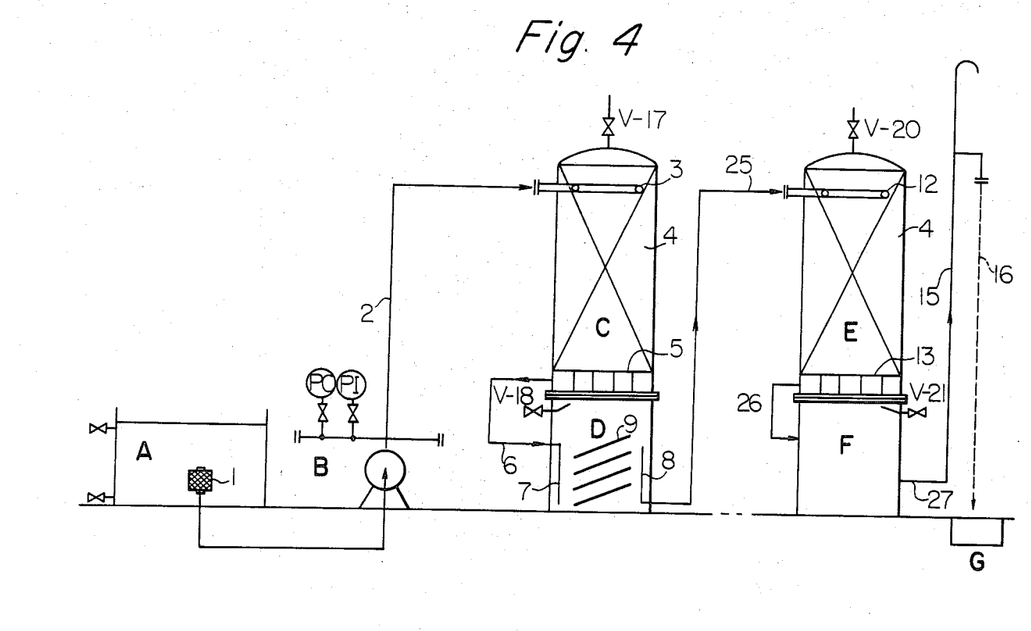

Furthermore, as a modified embodiment of the apparatus shown in FIG. 1, that shown in FIG. 4 is provided wherein the liquid feed to be treated may be allowed to flow following the route shown with arrows in FIG. 4. A flow sheet of this modification is summarized as follows:

(A)-(1)-(B)-(2)-(3)-(C) (4)-(5)-(6)-(7)-(D)-(8)-(25)-(12)-(E) (4)-(13)-(26)-(F)-(27)-(15)-(16)-(G)

Of course, in the modified embodiment, the route may also be altered to (E)-(F)-(C)-(D) and the apparatus may be provided with an equipment for backwashing, as described hereinbefore.

A packing to be charged into the coalescence chamber C and the adsorption chamber E is now illustrated in more detail.

The packing is composed of small pieces cut from a fiber web, as defined hereinbefore, which is made, for example, by extruding a fiber-forming liquid such as a molten polyolefin through an orifice while blowing a gas stream at the same time as the liquid leaves the orifice, i.e. before the liquid is shaped into a fiber, or immediately after the liquid is shaped into a fiber and the freshly spun fiber having not yet completely solidified is made to run against a collecting surface which is moving continuously. The packing piece is preferably in the approximate form of cube, right parallelepiped, sphere or the like. In the case of a cube or right parallelepiped, the size is preferably such that a ratio of the average side length L to an inner diameter D of the coalescence or adsorption chamber is within the range of 0.001 to 0.1. When the ratio exceeds 0.1, in which case the packing is usually of a sheet-like shape, uniform distribution of the liquid stream cannot be ensured over all the chamber. On the contrary, when the ratio is smaller than 0.001, i.e. the packing is a minute particle, the liquid tends to choke the packing and the effect of backwashing is lowered.

The fiber to be used for the packing preferably has an average diameter of 1 to 100 $\mu$. The fiber includes, for example, synthetic fibers such as polyamide, polyolefin, polyester and polyacrylonitrile; cellulosic fibers; and inorganic fibers such as metal, carbon and glass. Among others, polyolefin fibers are suitable. The polyolefin used herein is preferably a homopolymer or copolymer of either ethylene or propylene and has an intrinsic viscosity [$\nu$] of 0.3 to 2.0, preferably 0.3 to 0.8, the intrinsic viscosity being determined in tetraline at a temperature of 135°C.

Figure 5:
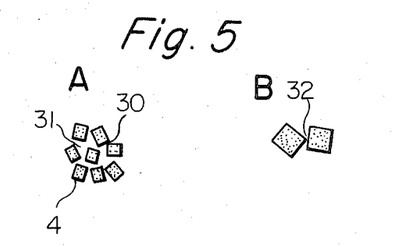

Referring to FIGS. 5(A) and (B) illustrating the packing pieces charged in the coalescence or adsorption chamber, there exist two kinds of passages or void spaces between the packing pieces; large void spaces 31 and small void spaces 30 (both referred to as "fluidized phase"). The small void spaces 30 and the very small void spaces (i.e. referred to as "fixed phase"), the latter of which exist inside the packing piece as described before, are useful as a passages for filtering sludge. The large void spaces 31 are useful as a passages for leading the liquid stream to the small void spaces 30. Thus, all the pieces of packing are three-dimensionally and organically combined with each other to construct thereby a filter as a whole. Sludge is caught in the small void spaces 30 between the pieces and the very small void spaces inside the pieces, as described before, to form thereby a bridge 32.

Coalescence phenomenon is hereinafter illustrated with reference to FIGS. 6(A) and (B), which schematically show the whole courses of coalescence proceeding on the surface of an oleophilic packing material and a lyophilic packing material respectively.

Figure 6:
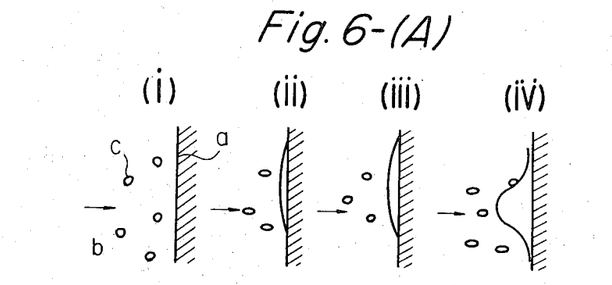

As shown in FIG. 6(A), when the liquid dispersion flows in the direction indicated by the arrow, fine oil droplets c approach the packing surface a (i), adhere to the surface (ii), and then, the adhered oil grows by degrees (iii and iv). The oil adhered to the surface a as shown in (iv), owing to its surface tension, spreads flatly over the surface and diffuses inside the packing piece.

When the diffusion rate of oil inside the packing piece is lower than the feed rate of oil droplets running against the surface, the surface portion of the packing is first saturated and then supersaturated with oil, and the oil accumulates by degrees thereon as shown in FIGS. 6(A) (ii), (iii) and (iv), and finally the oil is moved and separated therefrom as a large droplet by the action of the liquid stream.

Further, even in the case where the packing is composed of relatively lipophilic material such as polyamide, fine oil droplets c dispersed in liquid, when they happen to approach the small void space inside the packing piece, are shed by the packing filled with liquid as shown in FIG. 6(B)(i) and stay close to the surface of the packing without entering into the bore as shown in FIG. 6(B)(ii) and then, collide with each other for the most part with an increase of the droplets in number to thereby coalesce and finally, the enlarged droplets are successively carried away by the liquid stream with an increase of the flow resistance thereof as shown in FIG. 6(B) (iii).

The small piece of a felt-like structure to be used as a packing is characterized as preferably having voidage of not less than 80 percent, apparent specific surface area of not less than 1.0 cm²/cm³ and compressibility of not more than 60 percent. Further, it preferably exhibits air permeability ranging from 60 to 500 cc/cm²·sec.

In other words, the small piece preferably exhibits the following characteristics: (1) a high capacity for adsorbing fine oil droplets and fine sludge particles suspended in waste water or other liquids, (2) large apparent specific surface area, (3) a stiffness required as a packing material, (4) water repellency, particularly for the separation of oil from water, and (5) an air permeability falling within a stated range, particularly for the separation of sludge particles.

The reasons for the above are hereinafter illustrated in more detail.

In general, in order to effect the selective adsorption separation of oil droplets or sludge particles from turbid liquid or oily water passing through a packing layer, the following prerequisites should be satisfied. (1) Oil droplets or sludge particles in a fluidized phase stand a fair chance of making contact with a packing. (2) Oil droplets or sludge particles contacting a packing oil readily collected on the packing. (3) Voidage of a fixed phase is sufficiently high. (4) In a fixed phase, oil droplets or sludge particles fully penetrate inside a packing. (5) Uniform distribution of liquid stream is ensured. (6) The filtering pressure is low. (7) A volume ratio of the fluidized phase to the fixed phase invariably falls within the stated range, wherein the terms fluidized phase and fixed phase, as already defined, mean a void space between the packings where the liquid or aqueous dispersion flows and the packing itself, and fine void spaces or passageways inside the packing, respectively.

First, in order to give oil droplets or sludge particles a fair chance to make contact with a packing in a fluidized phase, complete mixing should be conducted in the fluidized phase, i.e. the fluidized phase or the passage should be narrow, complicated with many turns and twists.

Accordingly, a packing piece having a small size, i.e. having a large apparent surface area to the volume is preferred. The minimizing of the packing size is also effective to achieve uniform distribution of liquid stream over all the packing layer. However, when the size is excessively minimized, the packing piece tends to get out of shape and further it becomes difficult to observe the distinction between the fluidized phase and void spaces inside the packing piece and consequently, the filtering pressure inevitably increases, which leads to a reduction of the capacity for separating sludge. The minimum particle size of a packing piece is approximately 2 mm. In general, the preferable particle size is within the range of approximately 5 to 20 mm with due consideration for various conditions other than the above. Concerning the apparent specific surface area of the packing piece, a detailed explanation will be made hereinafter, in examples.

Secondly, in order that oil droplets may be substituted for water on the packing surface when the oil droplets contact therewith, the packing piece should preferably have a sufficiently high voidage and exhibit water repellency and oleophilic property.

Preferable voidage of the packing piece is at least 80 percent. In the case where void spaces inside the packing piece have a capacity required for sorbing oil droplets owing to capillarity and discharging water, the void spaces are gradually filled with oil in place of water. The capacity is proportional to the pressure required for making water penetrate through the packing piece against water repellency thereof (which pressure is referred to herein as "water leakage pressure") and therefore, the capacity can be deduced from the pressure. In fact, the effect of oil adsorption increases with an increase of the water leakage pressure, as illustrated in the examples. In the separation of liquid, the packing preferably have a water leakage pressure of at least 3 g/cm² for the desired results. Diffusion of oil in a fixed state depends upon both the capacities for adsorbing oil owing to capillarity and for discharging water, i.e. water leakage pressure, which is similar to that in the substitution of oil for water. Accordingly, if the water leakage pressure is sufficiently high, water filling in the void spaces inside the packing piece is rapidly substituted by oil due to capillarity.

Catching of the fine sludge particle onto the packing piece depends mainly upon the particle size of the sludge, voidage of the packing piece and the size of void spaces inside the packing piece. It has been found from our investigation that a voidage of the packing piece is preferably at least 80 percent, and that, when a packing piece having such a voidage and void spaces of 1 to 50 $\mu$ size is utilized, all sludge particles having a size of more than approximately 1 $\mu$ can be caught and those having a size of approximately 10 μ or less can be caught inside the packing piece.

The size of void spaces inside the packing piece can be represented by the air transmission rate through the packing piece. The packing piece having a high air permeability, which is thought of as having void spaces of a large size, is suitable for the separation of sludge particles of a large size, but, the packing piece of a low air permeability is suitable for the separation of those of a small size. The packing piece to be used in the present invention preferably has an air permeability of 10 to 500 cc/cm²·sec at a pressure differential of 10 mm H₂O/cm.

Further, in order to maintain a low filtering pressure inside the packing layer and maintain a volume ratio of the fluidized phase to the fixed phase within a stated range, the packing piece should exhibit a high mechanical strength and thereby, it does not undergo transformation with a slight increase of the filtering pressure and thus, the passage between the packings, which passage should be a fluidized phase in itself, is not choked up.

Stiffness of the packing can be deduced from the compressibility. If the compressibility is not more than 60 percent at a pressure of 0.5 kg/cm², an undesirable increase of the filtering pressure is retarded and the low filtering pressure can be restored to a great degree by backwashing. However, in the case of the compressibility exceeding 60 percent, the packing piece still more undergoes compressional transformation with an increase of the filtering pressure and further, the transformation incurs a blockade of void spaces between and inside the packings, which causes a vicious circle in the increase of the filtering pressure. Therefore, the latter packing is mostly not practical.

An actual oil-water mixture generally contains a considerable amount of solid sludge therein. For example, oily waste water occasionally contains solid sludge exceeding several tens of ppm. Moreover, the sludge is usually in the form of viscous oily mud, which is an admixture of the sludge and oily material, and consequently, once the sludge falls into fine void spaces inside the packing having such a high compressibility, it cannot be easily removed.

The packing layer comprising small packing pieces of the present invention, which layer is thought of as a kind of adsorption layer, involves a fluidized phase and a fixed phase separately and therefore, the filtering pressure does not readily increase which is contrary to a filtration layer. Further, since adsorption of sludge can be effected over all the surface of the fixed phase, the packing has the capacity for adsorbing an extremely increased amount of sludge without refilling thereof. Since the adsorption of fine sludge particles in the fixed phase is not so strong as is observed, for example, in a filter cloth where sludge particles are collected against the liquid stream, the sludge so collected can easily removed by backwashing and therefore, the packing can be repeatedly used over a prolonged period even for viscous oily mud.

The terms "water leakage pressure", "compressibility", "air permeability" and "apparent specific surface area", used herein, are defined as those which are determined according to the following test procedures, respectively:

A. Determination of water leakage pressure (mm H₂O)

Figure 7:
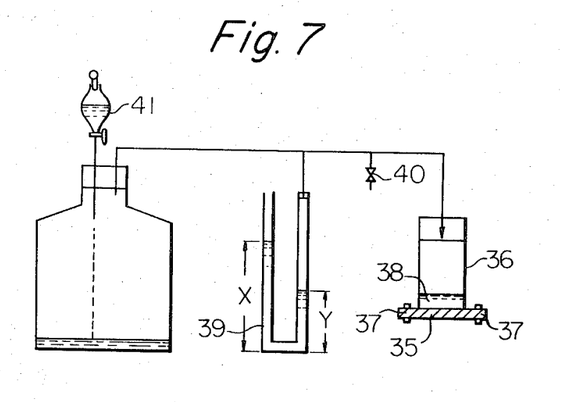

The test apparatus is schematically shown in FIG. 7. The procedure is as follows:

i. A sheet-like web is cut with a cutter to prepare a test speciment of an area of 20 cm square.

ii. The specimen 35 is clamped over the opening of the downward open cylindrical vessel 36 (a bolt hole 37 is bored with a heated iron rod).

iii. 200 cc of water 38 is poured into the cylindrical vessel 36 (the water does not penetrate into the specimen at this time because of water repellency of the specimen), and the vessel is connected with a water manometer 39.

iv. The purge valve 40 is shut and water is dropped from the separating funnel 41 at a rate such that the inner pressure increases at a speed of 5 mm of water per minute.

v. Both heights (X and Y) of water in the manometer are measured at the time when water leakage commences.

vi. Water leakage pressure is defined as a pressure differential (X-Y) between both the heights and indicated by an average value of three tests, each test using a specimen different from the other two.

B. Determination of compressibility i. A test specimen of an area of 10 cm square is prepared by cutting a sheet-like web. Using a constant-rate-type extensometer, the load-deformation curve is recorded at a compression speed of 2 cm/min and a chart speed of 40 cm/min until the compression load of 0.5 kg/cm² is reached.

ii. Compressibility is determined by the following equation:

Compressibility (%) = $(a/20d) \times 100$ wherein $a$ is a compressive strain, recorded on the chart, corresponding to the load of 0.5 kg/cm² and $d$ is a thickness of the test specimen at a load of 0.5 g/cm².

C. Determination of air permeability

Figure 8:
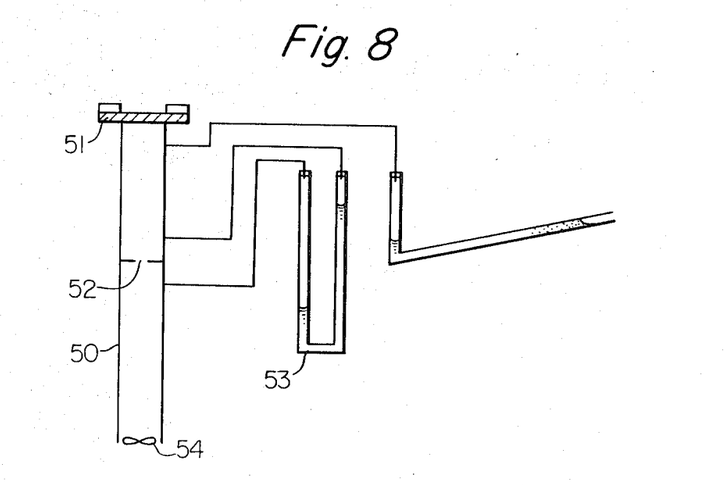

The test apparatus is schematically shown in FIG. 8. The procedure is as follows:

i. The specimen 51 to be tested is clamped over the opening of the cylinder 50.

ii. Both ends of the water manometer 53 are connected with the cylinder 50 at both the points above and below the orifice 52, respectively, which orifice plate is fitted to the central part of the cylinder 50.

iii. The number of revolutions of the fan 54, fitted to the lower part of the cylinder 50, is gradually increased so as to increase the air blast rate. When the pressure differential reaches 1 cm of water, the volume rate of flow of air (Q' cc/cm²·sec) through the specimen is measured.

iv. The volume rate of flow of air (Q" cc/cm².sec) at the pressure differential of 1 cm of water/cm, which volume rate is expressed as air permeability in the specification, is determined by the following equation:

$$Q'' = Q'\sqrt{X}$$

wherein $X$ indicates a thickness of the specimen in cm.

D. Apparent specific surface area

The small piece of a felt-like fiber web has a structure such that fibers are interlocked with each other and hence there exist a great number of fine void spaces therein. Thus, the apparent specific surface area means apparent surface area per apparent volume, in cm²/cm³, leaving the fine void spaces out of consideration.

The present invention involving the apparatus and the process hereinbefore described has the following advantages:

i. A substantial part of insoluble oil droplets and sludge can be removed.

ii. Almost all kinds of oily material can be removed.

iii. The present system has enough flexibility for absorbing a wide range of fluctuation in the concentration of oil and sludge.

iv. Because of physical treatment, a by-product of sludge is not produced and the recovered oil does not deteriorate, and is therefore reusable.

v. Consumption of the packing is low.

vi. The apparatus has a small size, light weight and simple structure, and the cost of maintenance is low.

The apparatus and the process are advantageously applied to the separation of oily material and sludge in waste water from various factories in, for example, the petroleum, iron and steel, chemical, shipbuilding and machine industries.

Example 1

Using the apparatus shown in FIG. 1, waste water containing a refuse mineral lubricating oil from a factory was treated at a flow rate of 6.5 m/hr under the conditions shown in Table 1.

Table 1

| Name | Size | Remarks |
| --- | --- | --- |
| Pump | 0.5 × 3 kg/cm² | Volumetric metering pump |
| Packing chamber | 300 mmφ × 1200 mmH | Amount of packing charged: 10 kg |
| Settling separator | 300 mmφ × 350 mmH | 8 separating plates; distance 70 mm |
| Oil adsorption | 300 mmφ × 1200 mmH | Length of the adsorption zone, 200 mm |
| Packing | 1 cm × 1 cm × 1 cm | Polypropylene fiber; distribution of fiber diameter, 5 – 100 μ |

Figure 9:
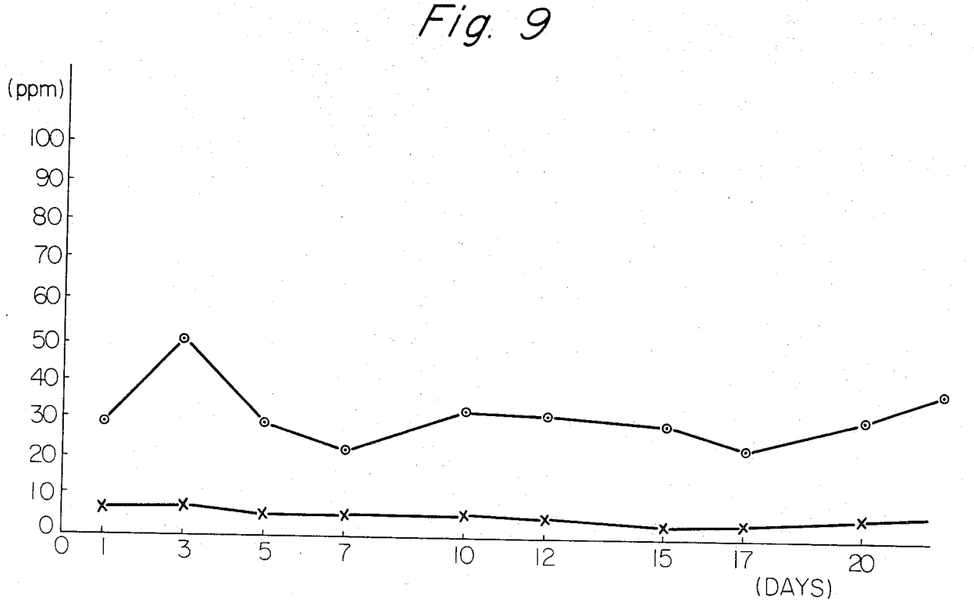
FIGS. 9 and 10 show graphs indicating the dependence of the oil and sludge content (in ppm), respectively, in waste water on the lapse of an operation period (in days), in Example 1.
Figure 10:
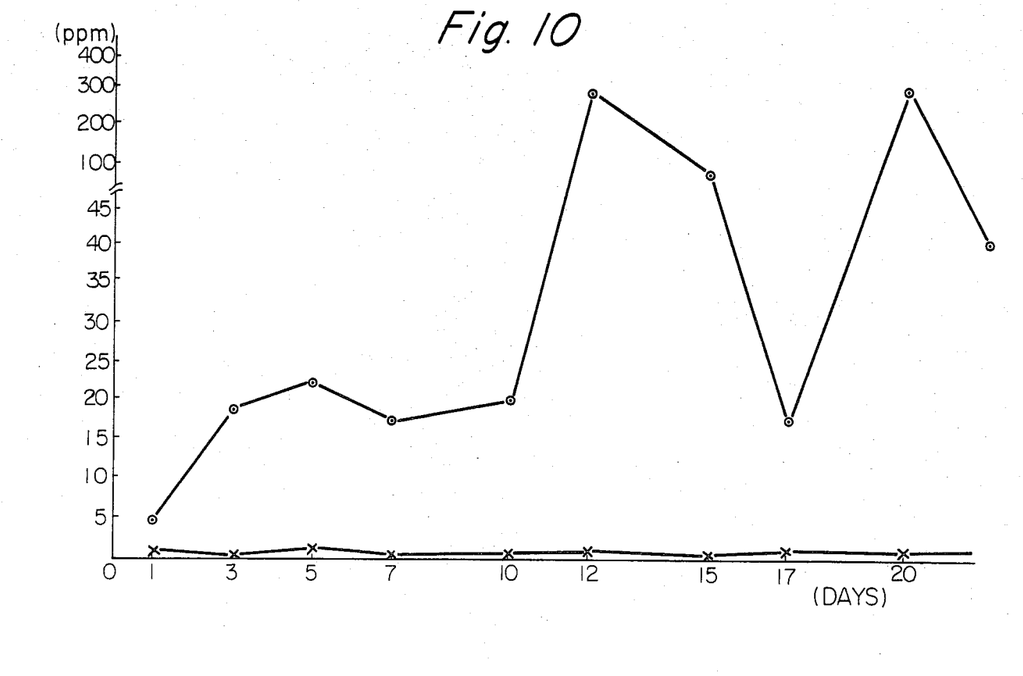

Results are shown in Table 2 and FIGS. 9 and 10, from which it is evident that both the concentrations of oil and sludge in the waste water feed were drasticllly reduced. In FIGS. 9 and 10, the ordinate indicates the oil concentration and the sludge concentration (in ppm), respectively, and the abscissa indicates the lapse of an operation period (in days), and the marks "—○—" and "—x—" indicate waste water before and after the treatment, respectively.

Table 2

Oil and sludge concentration in waste water

| | Before treatment | After treatment |
| --- | --- | --- |
| Oil concentration | 30 ppm | 5 ppm |
| Sludge concentration | 40 ppm | 1 ppm |
| Flow rate | 0.5 M³/Hr | 0.5 M³/Hr |

Example 2

Polypropylene melt was spun into filaments by the so-called jet-spinning technique while running it against a collecting surface by blowing a gas stream in a manner such as mentioned hereinbefore, to thereby obtain a felt-like web wherein individual filaments are three-dimensionally interlocked with each other. Packings were made by cutting the web into small pieces in the approximate form of a cube having a side length of approximately 1 cm.

Figure 11:
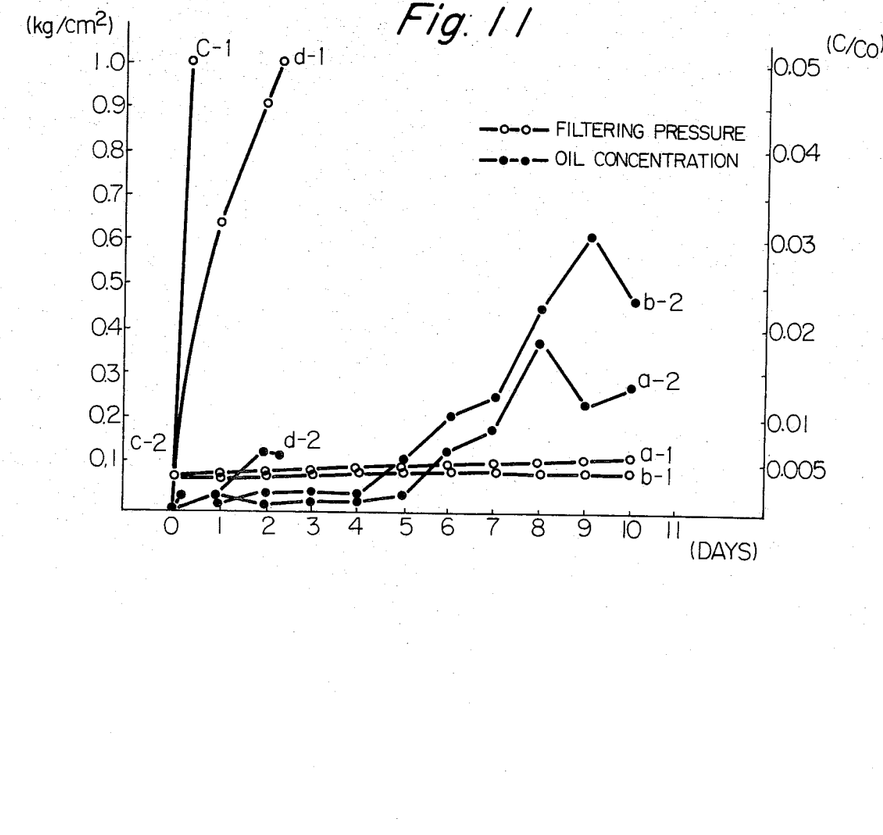
FIG. 11 shows graphs indicating the dependence of the oil content and the filtering pressure on the lapse of an operation period (in days), in Examples 2 – 5.

A column having a diameter of 30 cm and a height of 1 m was packed with the packing pieces at a packing density corresponding to a load of 50 g/cm², i.e. 0.101 g/cm³. After the complete substitution of air inside the packing layer with water, an oil-water mixture containing "C heavy oil" of a viscosity of 630 centipoises and having an oil concentration of 200 ppm, prepared by intensely stirring by a centrifugal pump, was passed through the column at a flow rate of 7 m/hr. The filtering pressure was found to be constantly below 0.2 kg/cm² over a period of ten days from start of the experiment, as shown in FIG. 11, in the graph (a-1).

A part of the liquid, so treated, was poured into a beaker and the beaker was left to stand for several minutes. The oil concentration in the lower transparent liquid varied with time as shown in FIG. 11, in the graph (a-2). As is apparent from the graph (a-2), the oil concentration was only $C/C_o = 0.019$ wherein Co and C indicate the oil concentration in the liquid before and after the treatment, respectively, i.e. 3.8 ppm at the most. In FIG. 11, the abscissa indicates the lapse of an operation period (in days) and both left and right ordinates indicate the filtering pressure (in kg/cm²) and C/Co, respectively.

Example 3

An oil-water mixture containing A heavy oil of a viscosity of 6.65 centipoises and having an oil concentration of 200 ppm was passed through the same column packed with the same packing pieces as those of Example 2 and under the same conditions as those of Example 2. Results aee shown in FIG. 11 with graphs (b-1) and (b-2). The filtering pressure was still below 0.2 kg/cm² even after ten days from the start of the experiment. The oil concentration in the lower transparent liquid, separated from the liquid so treated, was only $C/C_o = 0.031$, i.e. 6.2 ppm at the most.

Control Example 4

The same procedure as that of Example 2 was repeated wherein the column was packed with polypropylene staple fibers having a diameter of 29 μ and a staple length of 38 mm at a packing density of 0.1 g/cm³ instead of the packing piece but with all other conditions remaining substantially the same.

Results are shown in FIG. 11 in graphs (c-1) and (c-2). The filtering pressure reached 1.0 kg/cm² in 6.2 hours from the start of the experiment and therefore, it was impossible to continue the experiment. The oil concentration in the lower transparent liquid, separated from the liquid treated for such a short period of time, is shown in graph (c-2).

Control Example 5

The same procedure as that of Control Example 4 was repeated, but the same oil-water mixture as that of Example 3 was used. The filtering pressure reached 1 kg/cm² in 55 hours from the start, as shown in FIG. 11 as graph (d-1), and hence, it was difficult to continue the experiment. The oil concentration in the lower transparent liquid, separated from the liquid so treated, is shown in graph (d-2).

Results of Examples 2 and 3 and Control Examples 4 and 5 are summarized in Table 3.

Table 3

Oil concentration in the liquid treated

| Lapse of time | Oil Concentration 200 ppm, Viscosity 630 cp (C heavy oil) | Oil concentration 200 ppm, Viscosity 6.65 cp (A heavy oil) |
|---|---|---|
| | Ex.2 | Ex.3 |
| 1 day | 0 – 4 ppm 0.5 ppm | 0 – 6 ppm 0.4 ppm |
| 2 days | 0.4 ppm | 0.5 ppm |
| | Con. Ex. 4 | Con. Ex. 5 |
| 6.2 hours | 0 – 1 ppm 0.4 ppm | 0 – 10 ppm 0.2 ppm |
| 1 day | — | 0.5 ppm |
| 2 days | — | 1.2 ppm |
| 55 hours | — | — |

As evident from Table 3, the processes of Control Examples 4 and 5 wherein the small packing piece, cut from a sheet-like fiber web, of the present invention is not used, exhibit an excellent capacity nearly equal to that of the present invention, Examples 2 and 3, within a short period of time from the start. However, the capacity of Control Examples 4 and 5 does not last long (6.2 hours in Control Example 4 and 55 hours in Control Example 5); the capacity for separating oil from an oil-water mixture disappears in a short period of time. On the contrary, the capacity of the present invention, Examples 2 and 3, lasts at least ten days.

In other words, the packing layer of the present invention obviously has a greater advantage, as compared with that which has fine void spaces (fixed phase) therein but does not have relatively large void spaces (fluidized phase) as disclosed in U.S. Pat. No. 3,239,452 for example.

Example 6

Three kinds of molten polypropylene, nylon-6 and polyethylene terephthalate, were spun into filaments, respectively, by using a well-known jet-spinning apparatus under various spinning conditions while running them against a collecting surface and blowing a pressurized hot gas stream, in a manner such as mentioned hereinbefore, to thereby obtain felt-like webs. Packings were made by cutting the web into small pieces in the approximate form of a cube. Preparation conditions and characteristics of the packings are shown in Table 4, columns A and B.

The packing chamber C or E having a diameter of 30 cm and a packing layer height of 1 m, as illustrated in FIGS. 1 and 4, was packed with the above packing at a packing density corresponding to a load of 50 g/cm² and an oil-water mixture or solid sludge-containing waste water feed was passed through the chamber under the conditions described hereinafter. C/Co, the filtering pressure, the number of days elapsed until the filtering pressure reached 1.0 kg/cm², and the amount of material absorbed were determined, the results of which are shown in Table 4, column C.

The procedures for determining the above characteristics are as follows:

A. C/Co

After the complete substitution of air inside the packing layer with water, a machine oil-water mixture 1 of an oil concentration of 1 percent, prepared by intensely stirring by a centrifugal pump, and a water feed 2 containing titanium oxide having a particle size of 1.8 $\mu$ are passed through the packing column at superficial velocities of 7 meters/hr and 11 meters/hr, respectively. The concentrations ($C_o$) of oil and titanium oxide in the water feed and the concentrations (C) of oil and titanium oxide in the water stream flowing at a point 10 cm below the top of the packing layer are measured, from which measurements C/Co - 1 and C/Co - 2 are determined.

B. Filtering pressure

When the amount of machine oil fed into the packing column reaches five times the amount of the packing by weight, the column is left to stand for one day or more and thereafter, water is passed through the packing layer at a rate of 7 meters/hr while the pressure drop corresponding to the packing height of 1 m is determined.

C. Number of days elapsed until the filtering pressure reaches 1.0 kg/cm².

A water feed containing a finely divided talc particle having an average size of 7.2 $\mu$ in a concentration of 100 ppm is passed through the packing layer at a superficial velocity of 7 meters/hr in manner similar to the above, while the number of days elapsing until the filtering pressure reaches 1.0 kg/cm² is measured.

D. Amount of material adsorbed

Water feeds containing talc 1 having a particle size of 12 $\mu$ and titanium oxide 2 having a particle size of 1.8 $\mu$, respectively, are allowed to flow through the packing layer at a superficial velocity of 9 meters/hr in a manner similar to the above. When 24 hours elapse, the amounts 1 and 2 of both materials adsorbed on the top portion of the packing layer are measured, respectively.

Table 4

| Exp. No. | Polymer | Preparing conditions | | | | | |
|---|---|---|---|---|---|---|---|
| | | Extrusion rate g/min | Melting temperature °C | Air *1 pressure kg/cm² | Air *1 temperature °C | Collecting distance cm *2 | *3 Conveyor velocity cm/min |
| 1 | Polypropylene | 380 | 300 | 1.0 | 300 | 70 | 35 |
| 2 | do. | 310 | | 1.0 | 300 | 80 | 130 |
| 3 | do. | 380 | 290 | 0.5 | 290 | 120 | 55 |

Table 4 — Continued

Preparing conditions

| Exp. No. | Polymer | Extrusion rate g/min | Melting temperature °C | Air *1 pressure kg/cm² | Air *1 temperature °C | Collecting distance cm *2 | *3 Conveyor velocity cm/min |
|---|---|---|---|---|---|---|---|
| 4 | do. | 490 | 300 | 1.0 | 300 | 70 | 70 |
| 5 | do. | 490 | 320 | 1.0 | 320 | 90 | 250 |
| 6 | do. | 490 | 295 | 0.5 | 295 | 120 | 42 |
| 7 | do. | 620 | 300 | 1.0 | 300 | 70 | 42 |
| 8 | do. | 620 | 310 | 1.0 | 310 | 70 | 80 |
| 9 | do. | 705 | 310 | 1.0 | 310 | 70 | 59 |
| 10 | do. | 800 | 315 | 1.5 | 315 | 70 | 82 |

Table 4

Characteristics

| Exp. No. | Thickness cm | Air permeability cc/cm²·sec | Water leakage pressure mm H₂O | Cutting Size cm × cm | Apparent specific surface area cm²/cc | Compressibility % |
|---|---|---|---|---|---|---|
| 1 | 1.2 | 41 | 191 | 1 × 1 | 5.7 | 37 |
| 2 | 1.0 | 10 | 408 | 1 × 1 | 6.0 | 61 |
| 3 | 0.9 | 460 | (27) | 1 × 1 | 6.2 | 21 |
| 4 | 0.9 | 67 | 160 | 1 × 1 | 6.2 | 28 |
| 5 | 0.8 | 14 | 442 | 1 × 1 | 6.5 | (72) |
| 6 | 1.0 | 525 | (19) | 1 × 1 | 6.0 | 17 |
| 7 | 1.0 | 95 | 80 | 1 × 1 | 6.0 | 19 |
| 8 | 1.0 | 18 | 254 | 1 × 1 | 6.0 | 41 |
| 9 | 1.3 | 21 | 200 | 1 × 1 | 5.5 | 30 |
| 10 | 0.9 | 55 | 140 | 1 × 1 | 6.6 | 33 |
| 11 | 0.19 | 68 | 141 | 0.3 × 0.3 | 2.4 | 28 |
| 12 | 0.24 | 66 | 136 | 0.5 × 0.5 | 16.5 | 30 |
| 13 | 1.0 | 58 | 138 | 0.5 × 0.5 | 10 | 30 |
| 14 | 9.6 | 54 | 138 | 10 × 10 | (0.61) | |
| 15 | 1.7 | 55 | 137 | 2 × 2 | 3.2 | 31 |
| 16 | 5.0 | 59 | 137 | 4 × 4 | 1.4 | 31 |
| 17 | 1.0 | 324 | (0) | 1 × 1 | 6.0 | 19 |
| 18 | 1.0 | 145 | (0) | 1 × 1 | 6.0 | 26 |
| 19 | 1.1 | 25 | (0) | 1 × 1 | 5.8 | 42 |
| 20 | 0.5 | | (0) | 1 × 1 | 8.0 | 23 |
| 21 | 1.0 | (520) | (0) | 1 × 1 | 6.6 | 28 |
| 22 | 0.35 | 71 | (0) | 0.5 × 0.5 | 13.7 | 23 |
| 23 | 10.6 | 71 | (0) | 8 × 8 | (0.69) | 23 |
| 24 | 1.2 | 59 | (0) | 1 × 1 | 5.7 | (65) |
| 25 | 1.1 | 181 | (0) | 1 × 1 | 5.8 | (74) |
| 26 | 1.2 | 59 | 92 | 1 × 1 | 5.7 | 26 |

Table 4

Separation effect

| Exp. No. | C/Co 1 | C/Co 2 | Filtering pressure kg/cm² | Number of days 4 | Amount of material adsorbed (g/g) 1 | Amount of material adsorbed (g/g) 2 |
|---|---|---|---|---|---|---|
| 1 | 0.11 | 0.25 | 0.09 | 19.0 | | |
| 2 | 0.02 | 0.04 | 0.18 | 8.9 | | |
| 3 | 0.63 | 0.94 | 0.04 | >20 | | |
| 4 | 0.20 | 0.40 | 0.07 | >20 | | |
| 5 | 0.02 | 0.02 | 0.55 | 2.4 | | |
| 6 | 0.83 | 0.96 | 0.01 | >20 | | |
| 7 | 0.15 | 0.45 | 0.02 | 17.2 | | |
| 8 | 0.08 | 0.11 | 0.04 | >20 | | |
| 9 | 0.11 | 0.15 | 0.03 | >20 | | |
| 10 | 0.14 | | | | 0.59 | 0.48 |
| 11 | 0.02 | | | | 0.88 | 0.59 |
| 12 | 0.02 | | | | 0.79 | 0.52 |
| 13 | 0.08 | | | | 0.71 | 0.46 |
| 14 | 0.97 | | | | 0.11 | 0.23 |
| 15 | 0.56 | | | | 0.39 | 0.38 |
| 16 | 0.87 | | | | 0.18 | 0.27 |
| 17 | 0.57 | 0.96 | 0.03 | >20 | | |
| 18 | 0.51 | 0.82 | 0.05 | >20 | | |
| 19 | 0.38 | 0.42 | 0.06 | 19.1 | | |
| 20 | 0.40 | 0.19 | 0.02 | >20 | 0.45 | 0.51 |
| 21 | 0.93 | 0.99 | 0.05 | > 20 | | |
| 22 | 0.45 | | | | 0.65 | 0.52 |
| 23 | 0.99 | | | | 0.19 | 0.26 |
| 24 | 0.40 | 0.31 | 0.17 | 7.0 | 0.40 | 0.51 |
| 25 | 0.72 | 0.81 | 0.40 | 2.6 | | |
| 26 | 0.62 | 0.28 | 0.02 | 8.3 | | |

Note
* 1 Pressure and temperature of the air stream blasted to the melt extruded from the orifice, respectively.
* 2 The distance between the orifice and the collecting surface on the conveyor.
* 3 The velocity of the conveyor which continuously moves to carry the extruded fibers in the form of a web.
* 4 Number of days elapsing until the filtering pressure reaches 1.0 kg/cm².
* 5 Voidage of all packings was 80%.

As evident from Table 4, among the packing pieces cut from a sheet-like fiber web, those which have the specified characteristics in accordance with the present invention are far superior to the others in the ratio (C/Co) of the oil concentration in the water after the treatment to that before the treatment, in the filtering pressure and in the number of days elapsing until the filtering pressure reaches 1.0 kg/cm$^2$, i.e. until the separation capacity substantially disappears.

Further, it is evident that the packing layer of the present invention involving the fixed phase as well as the fluidized phase is excellent as compared with that comprising the conventional packing material or filter, which has void spaces between the packings (fluidized phase) but does not have fine capillary-like void spaces inside the packings (fixed phase), such as sand-like material, a small piece of paper, hard material having a rugged surface and the like.

Example 7

Using the apparatus shown in FIG. 1, waste water containing a refuse mineral lubricating oil from a factory was treated at a flow rate of 6.5 m/hr under the same conditions as those of Example 1, shown in Table 1.

Figure 12:
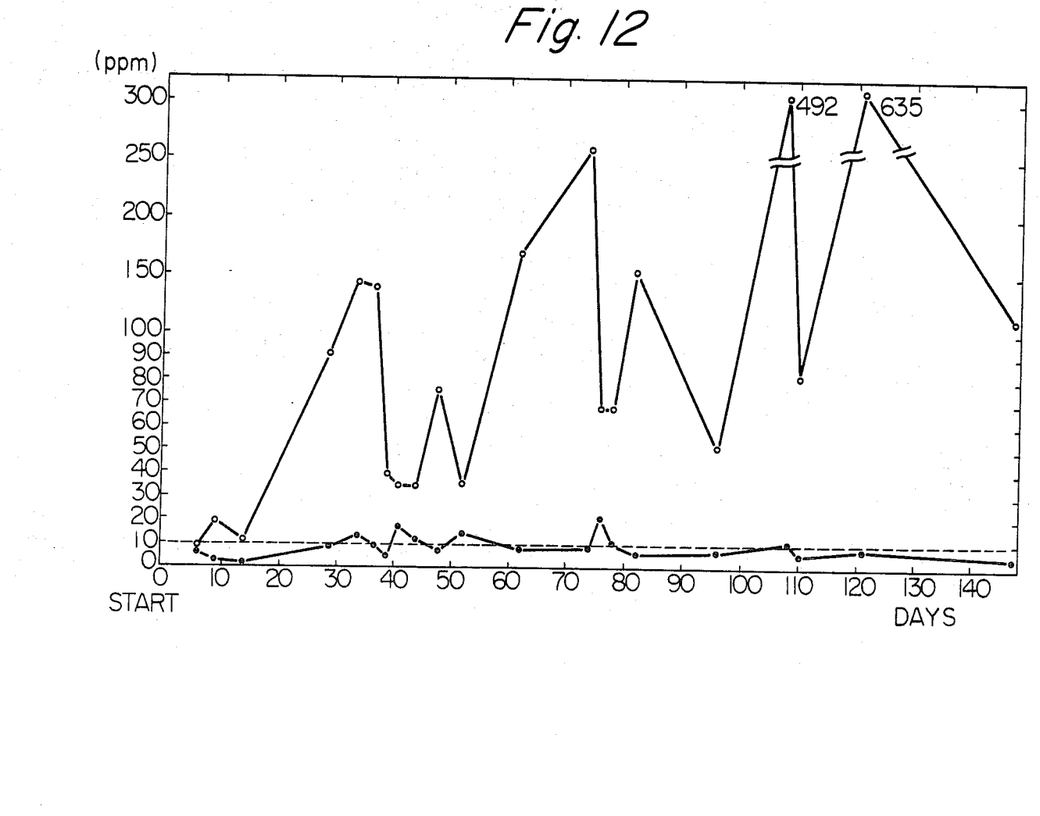
FIG. 12 shows graphs indicating dependence of the oil content on the lapse of an operation period (in days), in Example 7.

Results are shown in Table 5 and FIG. 12 wherein the ordinate and abscissa indicate the oil concentration (in ppm) and the lapse of an operation period (in days), respectively, and graphs marked with "—⊙—" and "—O—" indicate waste water before and after the treatment, respectively. It is evident from Table 5 and FIG. 12 that the oil concentration in the waste water was drastically reduced and the desired effect could be secured over a period of 140 days or more.

Table 5

| | Oil concentration in waste water | |
|---|---|---|
| | Before treatment | After treatment |
| Oil concentration | 167 ppm | 7.7 ppm |
| Flow rate | 0.5 M$^3$/hr | 0.5 M$^3$/hr |

What we claim is:

1. An apparatus for separating waste liquid comprising fine oil droplets and sludge both being suspended in a liquid carrier which comprises, a. a packing chamber to which said suspension is supplied, which is packed with small pieces cut from a porous fiber web for the absorption and coalescence of said fine oil droplets and the filtration of said sludge, said packing chamber having an inlet for the waste liquid located at an upper portion thereof, an outlet for the treated liquid located at a lower portion thereof, an inlet for backwashing liquid located at a lower portion thereof and an outlet for said backwashing liquid located at an upper portion thereof, said pieces inherently repelling said carrier, said pieces having voidage of at least 80 percent and an apparent specific surface area of at least 1 cm$^2$/cc at a water leakage pressure of at least 30 mmH$_2$O, b. a settling chamber to which the coalesced oil droplets are supplied for the specific gravity separation of said coalesced oil droplets, said settling chamber having an inlet for the treated liquid located at an intermediate portion thereof, an outlet for purified liquid located at a lower portion thereof and an outlet for the separated oil located at an upper portion thereof, and c. means connecting said outlet for said treated liquid of said packing chamber with said inlet for said treated liquid of said settling chamber.

2. An apparatus according to claim 1 wherein said small pieces are cut from a polyolefin fiber web and are in the approximate form of a cube or right parallelepiped and have a compressibility of not more than 60 percent at a load of 0.5 kg/cm$^2$.

3. An apparatus according to claim 2 wherein said small pieces cut from said polyolefin fiber web have a size such that L/D is between 0.001 and 0.1, wherein L indicates an average side length of said small pieces and D indicates an inner diameter of said packing chamber.

4. An apparatus according to claim 2 wherein said small pieces cut from said polyolefin fiber web have an air premeability of 10 to 500 cc/cm$^2$.sec at a pressure differential of 1 g/cm$^2$ to 1 cm thickness.

* * * * *